US006865310B2

(12) United States Patent
Yokouchi

(10) Patent No.: US 6,865,310 B2
(45) Date of Patent: Mar. 8, 2005

(54) MULTI-LAYER THIN FILM OPTICAL WAVEGUIDE SWITCH

(75) Inventor: Kishio Yokouchi, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 10/215,880

(22) Filed: Aug. 9, 2002

(65) Prior Publication Data

US 2004/0028316 A1 Feb. 12, 2004

(51) Int. Cl.$^7$ ............................ G02B 6/26; G02B 6/34; G02F 1/295
(52) U.S. Cl. ................................ 385/16; 385/8; 385/9; 385/10; 385/40; 385/37; 385/50
(58) Field of Search ........................... 385/8–10, 16–18, 385/39–41, 50, 37

(56) References Cited

U.S. PATENT DOCUMENTS

| | | | |
|---|---|---|---|
| 3,995,937 A | 12/1976 | Baues et al. | |
| 4,196,977 A | 4/1980 | Scibor-Ryiski | |
| 4,415,226 A | 11/1983 | Verber et al. | |
| 5,444,567 A | 8/1995 | Kataoka | |
| 5,455,618 A | 10/1995 | Hatori | |
| 5,627,925 A | 5/1997 | Alferness et al. | |
| 5,703,978 A * | 12/1997 | DiGiovanni et al. | 385/37 |
| 6,246,815 B1 | 6/2001 | Fujiwara et al. | |
| 6,353,690 B1 * | 3/2002 | Kulishov | 385/10 |
| 6,594,421 B1 * | 7/2003 | Johnson et al. | 385/37 |
| 2003/0235368 A1 * | 12/2003 | Kulishov et al. | 385/40 |

FOREIGN PATENT DOCUMENTS

| | | |
|---|---|---|
| EP | 0349907 A2 | 6/1989 |
| EP | 0349907 A3 | 6/1989 |
| EP | 0593081 A2 | 10/1993 |
| EP | 0664474 A1 | 1/1995 |
| EP | 0741499 A2 | 3/1996 |

(List continued on next page.)

OTHER PUBLICATIONS

Sheard et al., "Waveguide Grating Couplers", Department of Engineering Science, Oxford University, Oxford OX1 3PJ, United Kingdom.

(List continued on next page.)

Primary Examiner—Edward J. Glick
Assistant Examiner—Krystyna Suchecki
(74) Attorney, Agent, or Firm—Sheppard Mullin Richter & Hampton LLP

(57) ABSTRACT

A method and system are disclosed for switching at least part of a light signal out of a first waveguide by a Bragg grating formed from an electro-optic effect in the first waveguide. The Bragg grating is created by turning on a series of electrodes on each side of the first waveguide. The electrodes create electric fields in the core of the first waveguide which raise the refractive index in certain regions of the core. When the electric fields are tilted and evenly spaced apart, at least part of a light signal propagating through the waveguide, at a predetermined wavelength, is reflected out of the first waveguide. The reflected light signal can be switched back into a second waveguide by use of another Bragg grating. When the electric fields are off in the first waveguide the light signal, including the part of the light signal having the predetermined wavelength, continues straight on through the Bragg grating area. Thus a light signal of the predetermined wavelength is either switched to the second waveguide or kept in the first waveguide depending on whether the voltages are turned on or off on the electrodes.

26 Claims, 17 Drawing Sheets

FOREIGN PATENT DOCUMENTS

| | | |
|---|---|---|
| JP | 62194220 | 8/1987 |
| JP | 63124022 | 5/1988 |
| JP | 01214827 | 8/1989 |
| JP | 10170878 | 6/1998 |

OTHER PUBLICATIONS

Sasaki et al, "Optical Fiber Devices and Their Applications", Faculty of Engineering Ibaraki University, Hitachi, Ibaraki, Japan.

R. Chen, "Fully Embedded Guided–Wave Optical Interconnects with Full Packaging Compatibility with Microelectronics".

Murphy et al., "Design of Integrated Bragg Grating–Based Filters for Optical Communications", NanoStructures Laboratory, Massachusetts Institute of Technology, Dec. 7, 2001.

Spichiger et al., "Miniaturized Chemical Sensors", www.chemsens.ethz.ch/HTMLPresentationFolder1/index.htm, Dec. 7, 2001.

Geoff Bennett, "An Overview of All–Optical Switching", Marconi plc.

* cited by examiner

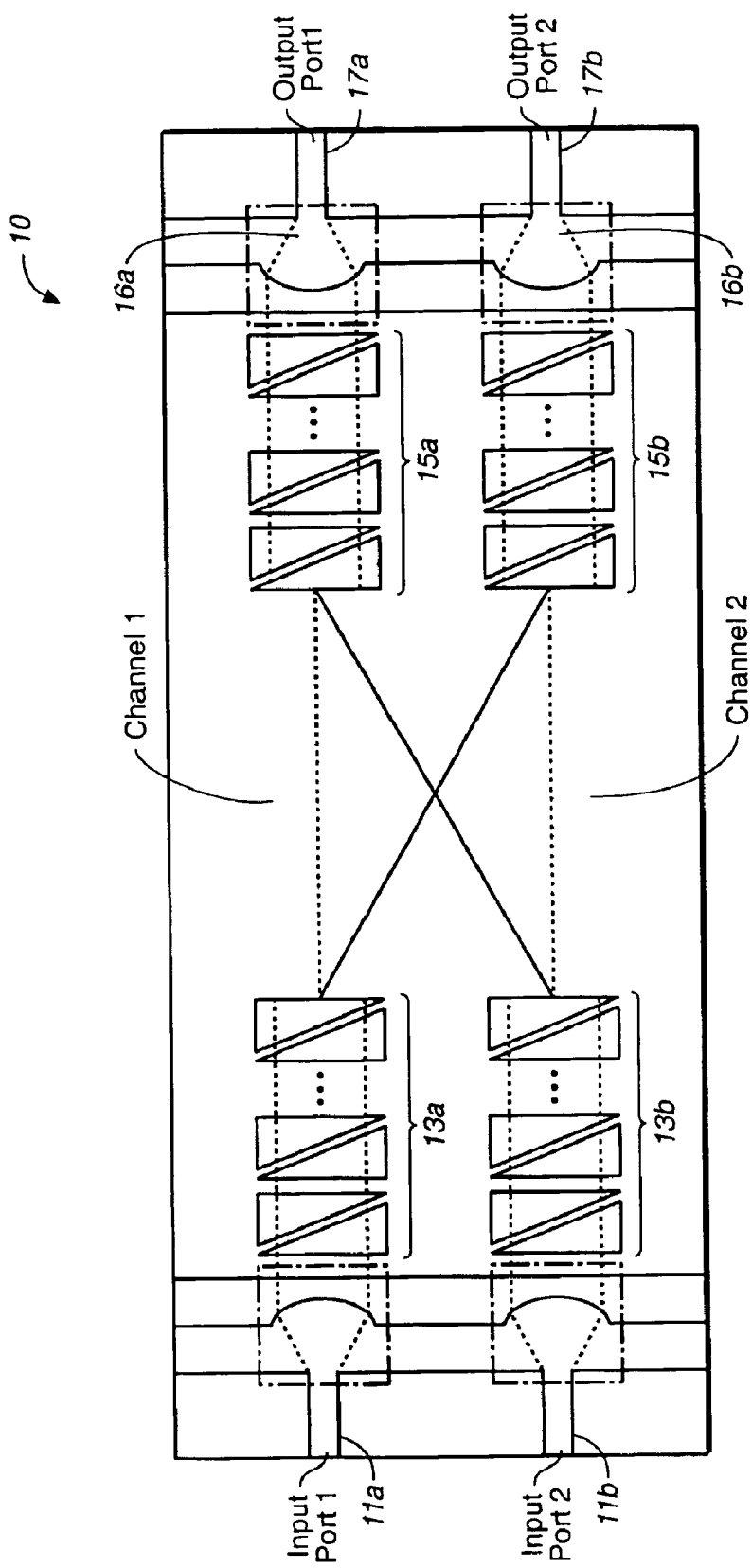
FIG._1

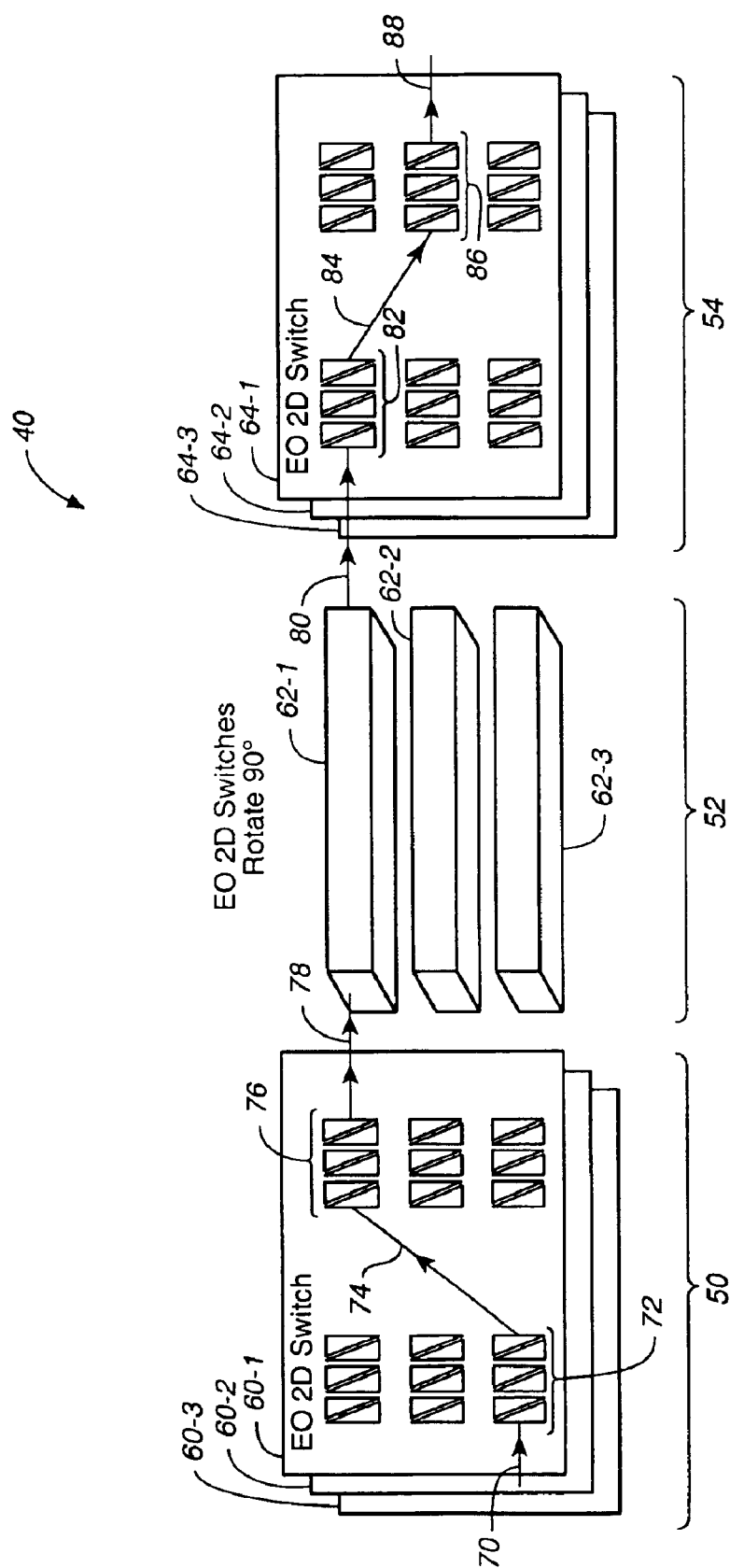
FIG._2

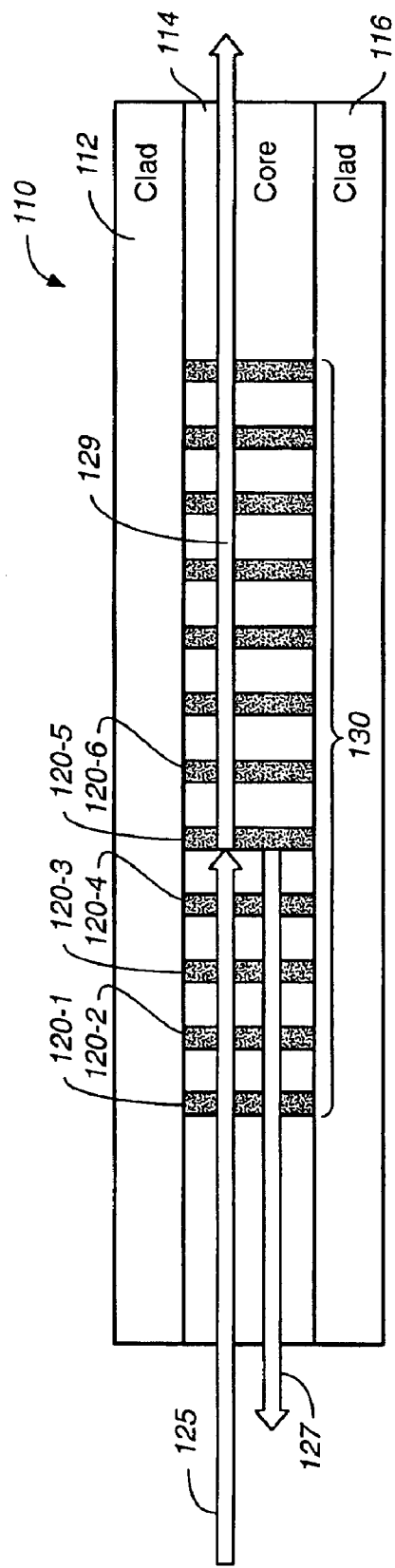
FIG._3

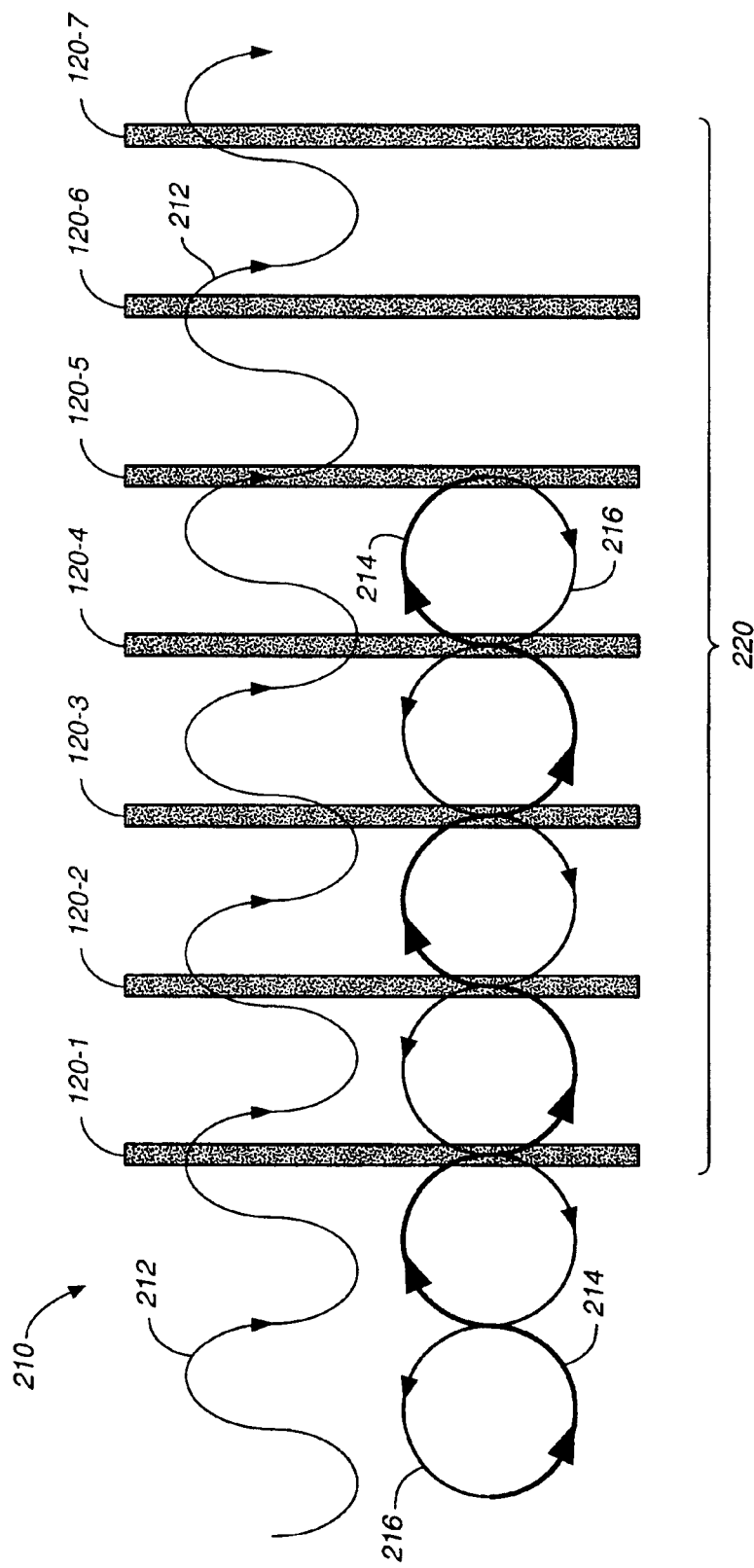
FIG._4

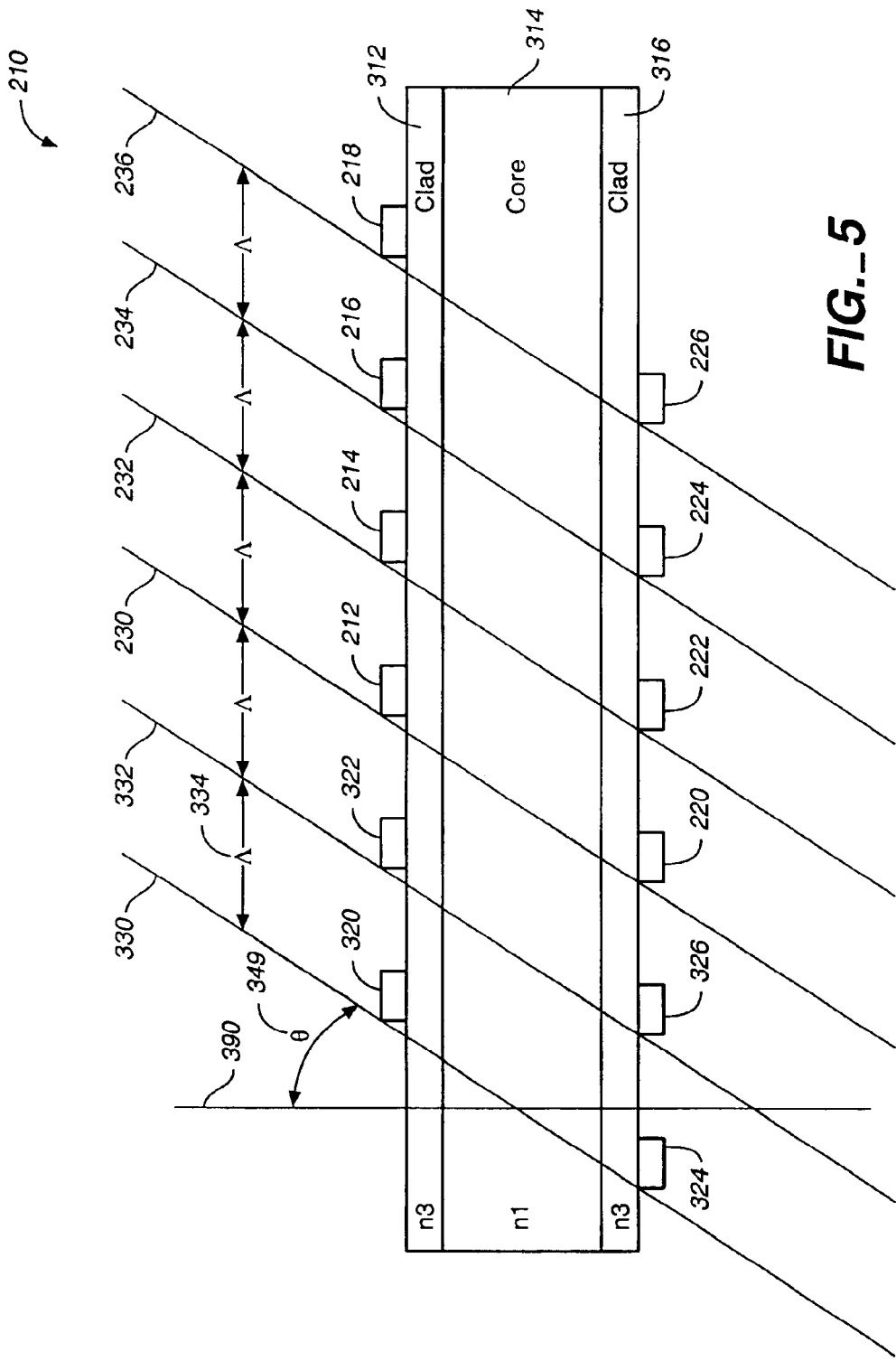
FIG._5

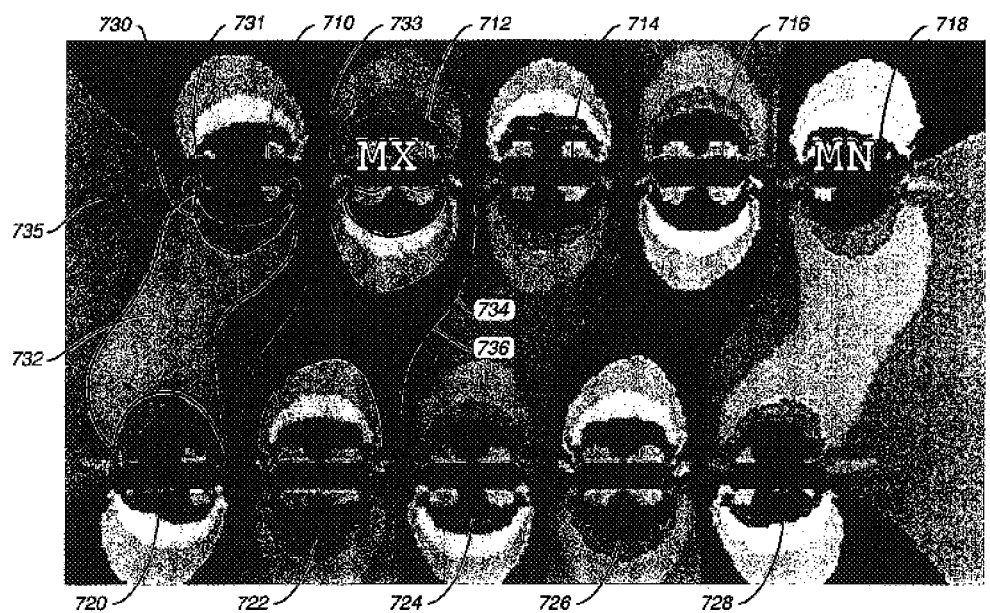
FIG._6

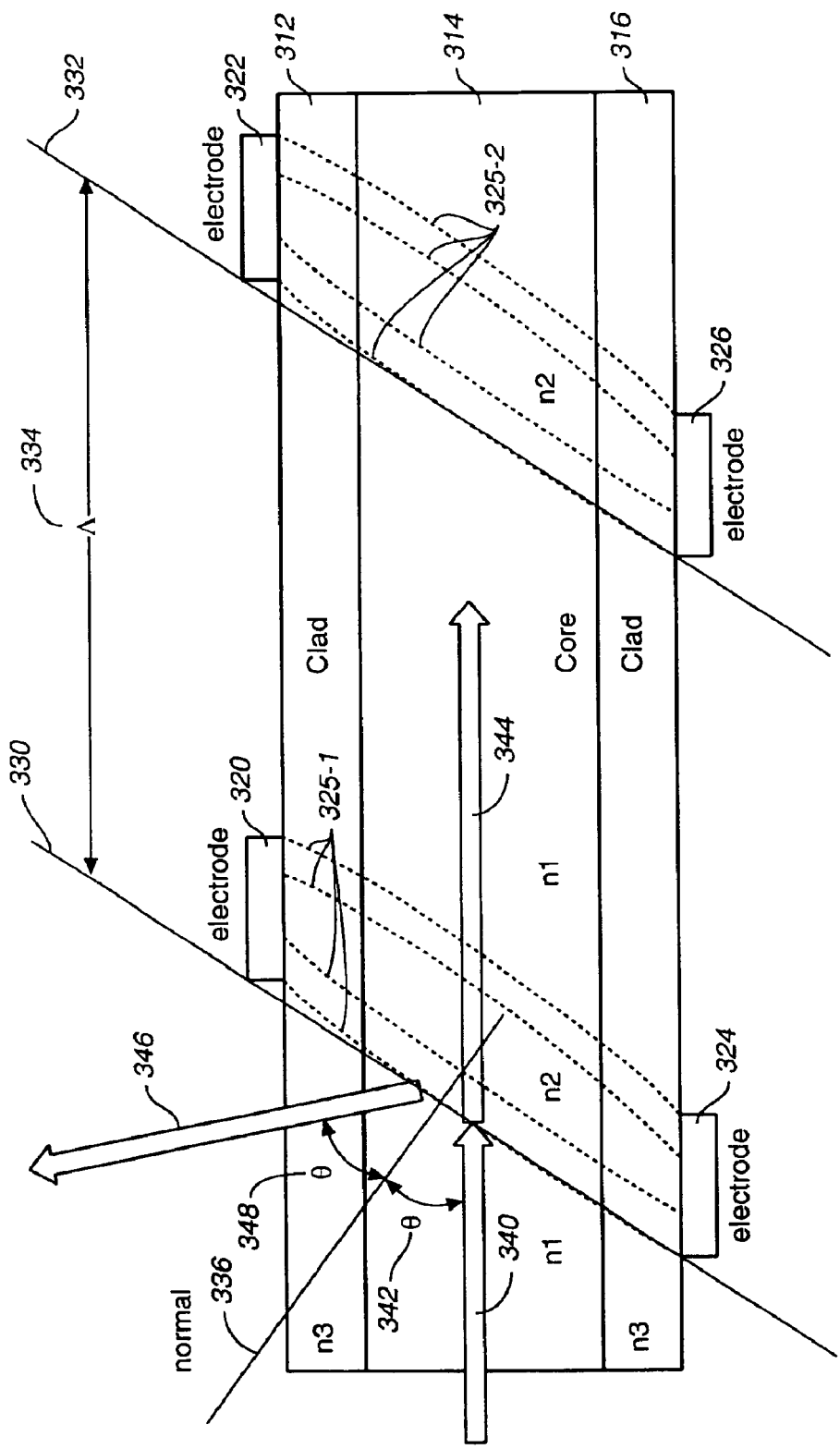
FIG._7-1

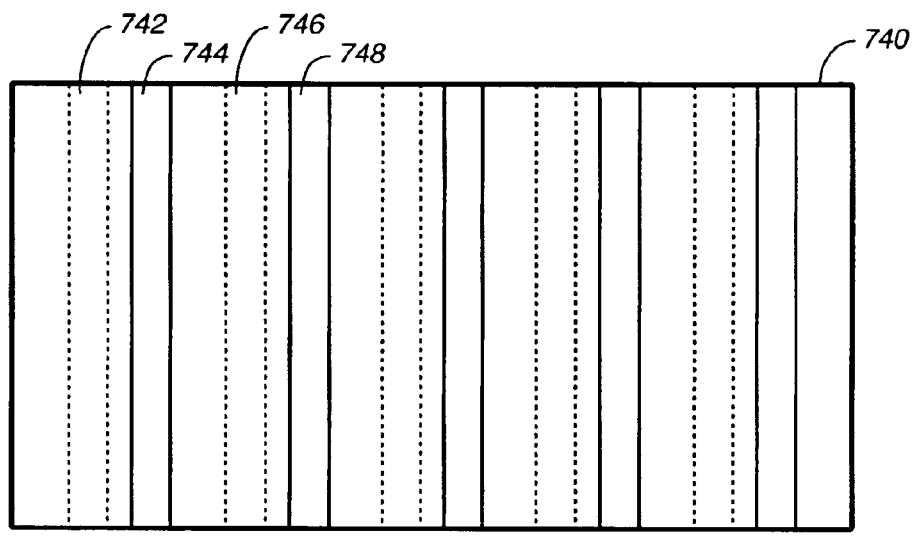
FIG._7-2
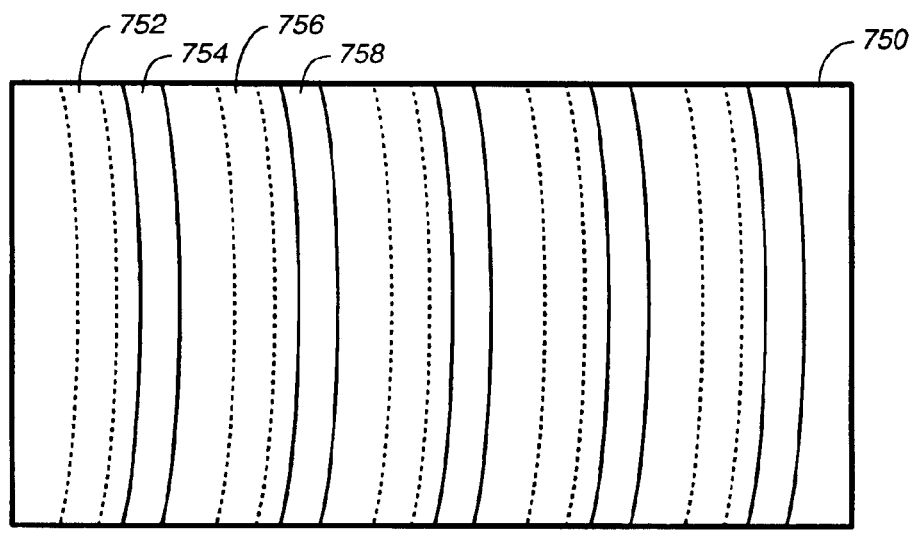
FIG._7-3

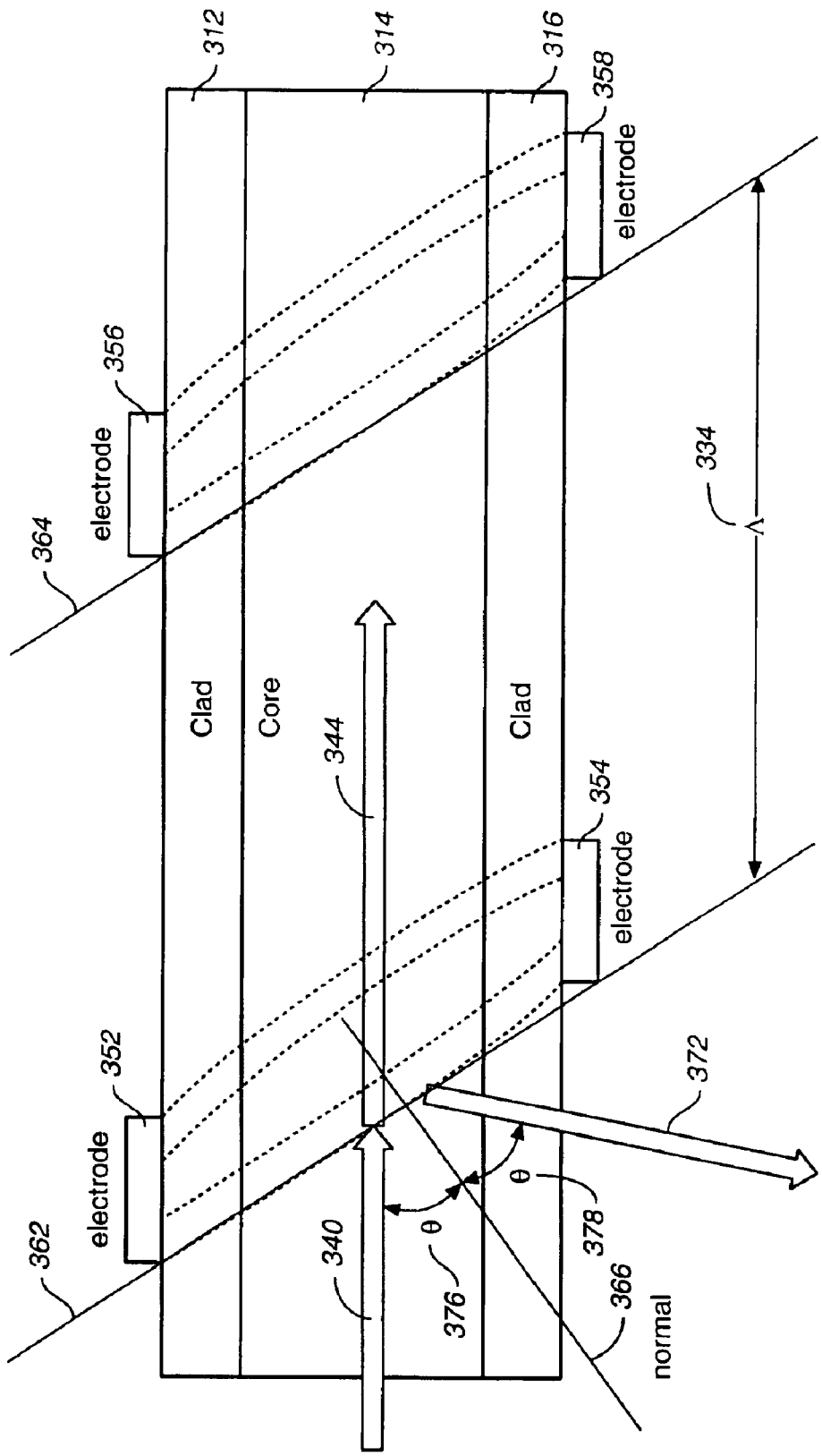
FIG._8

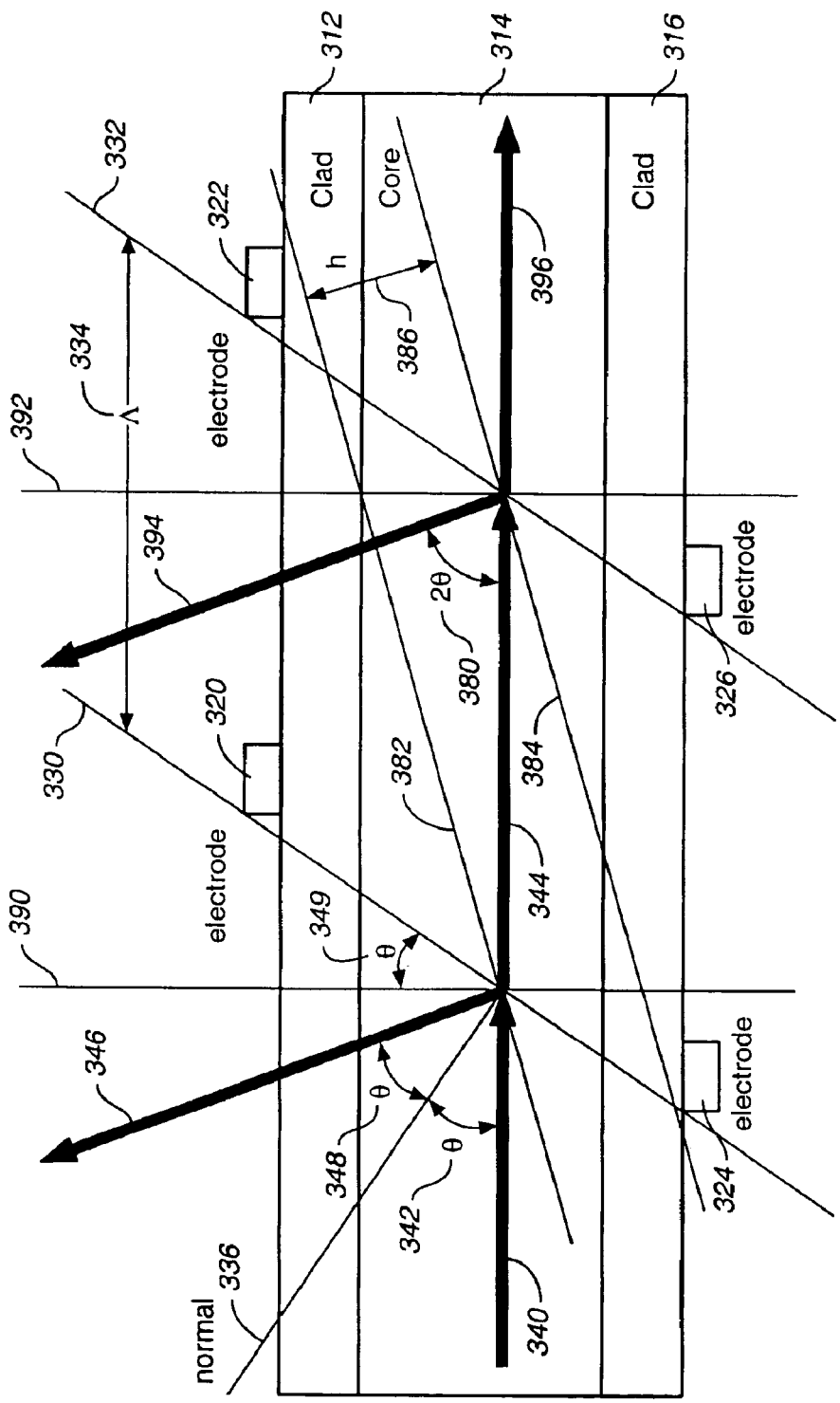
FIG._9

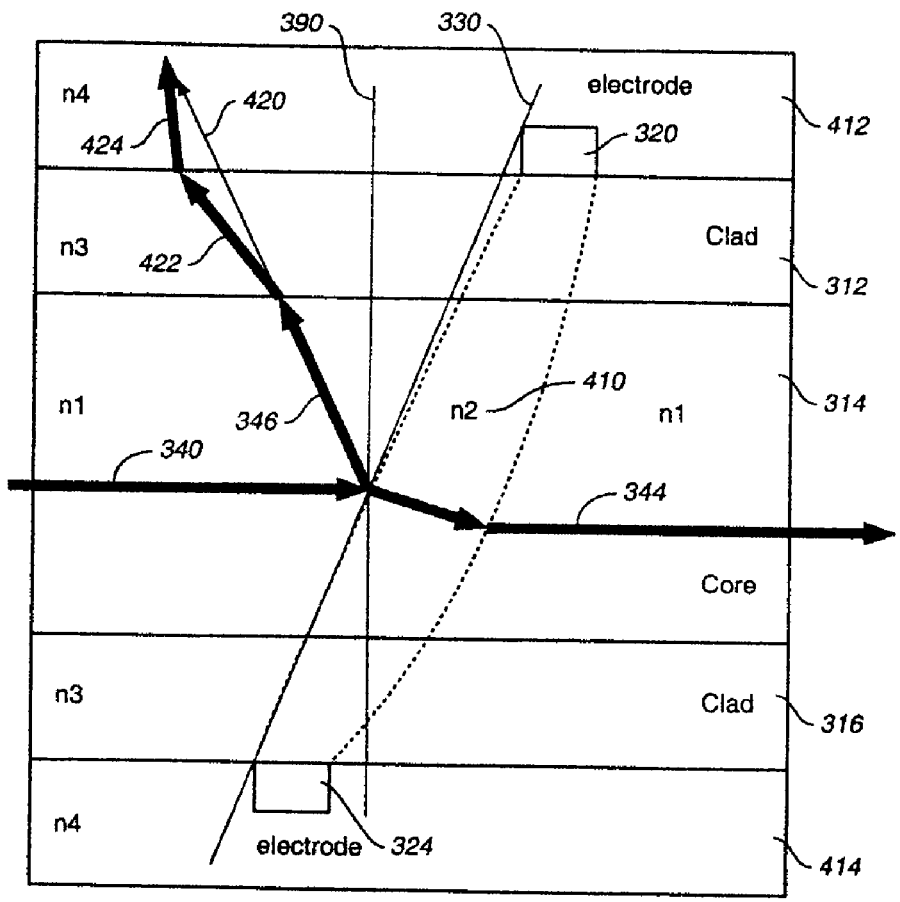
FIG._10

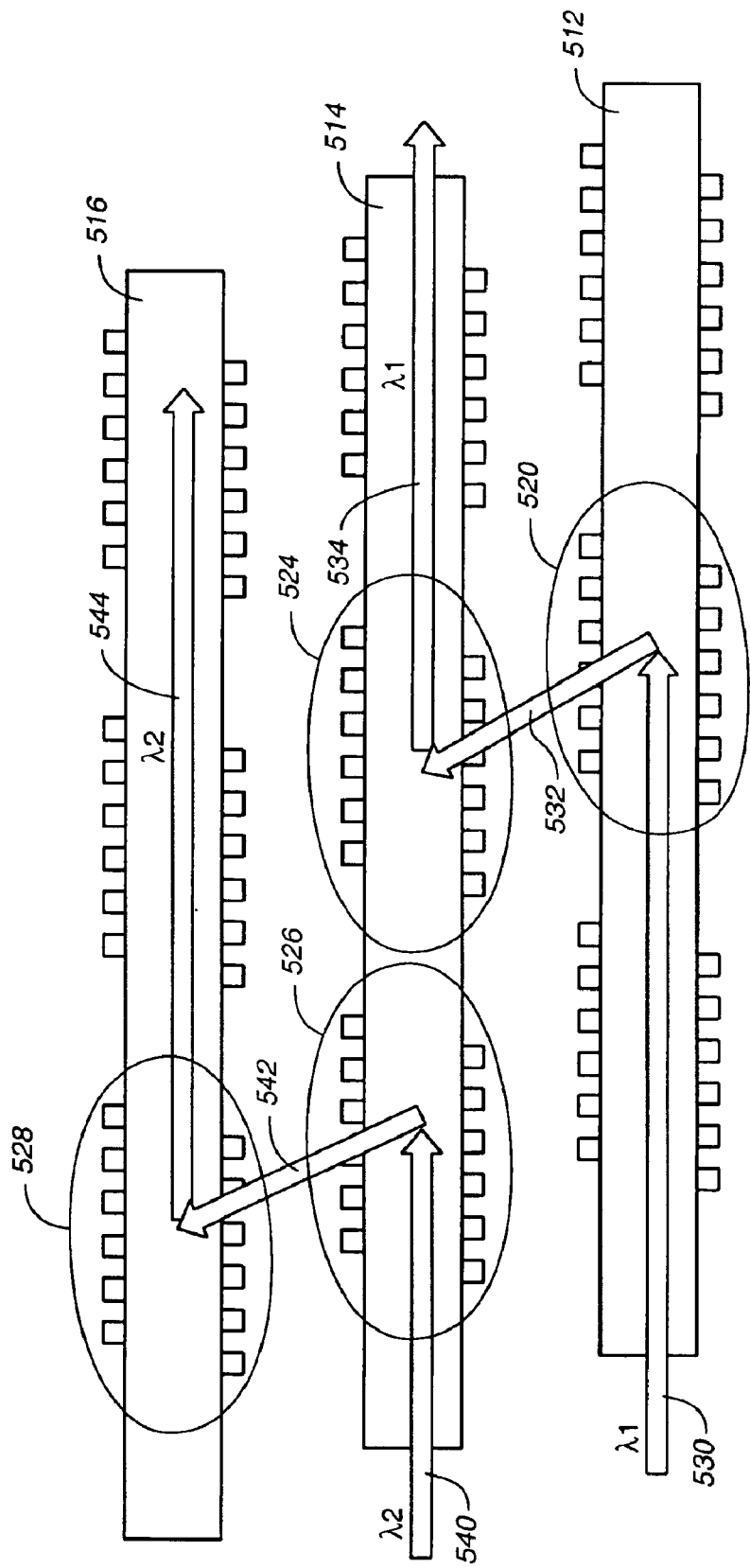
FIG._11

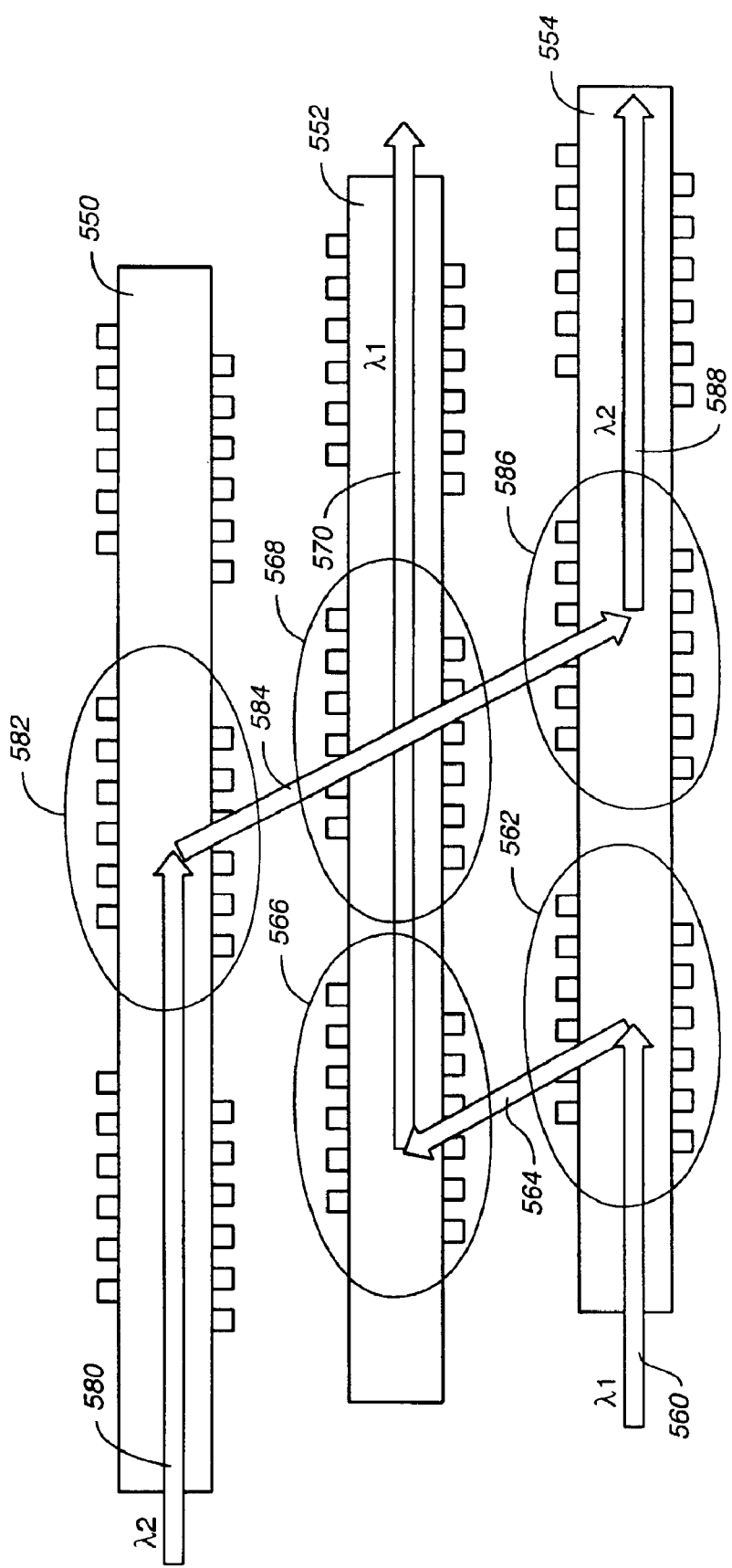
FIG._12

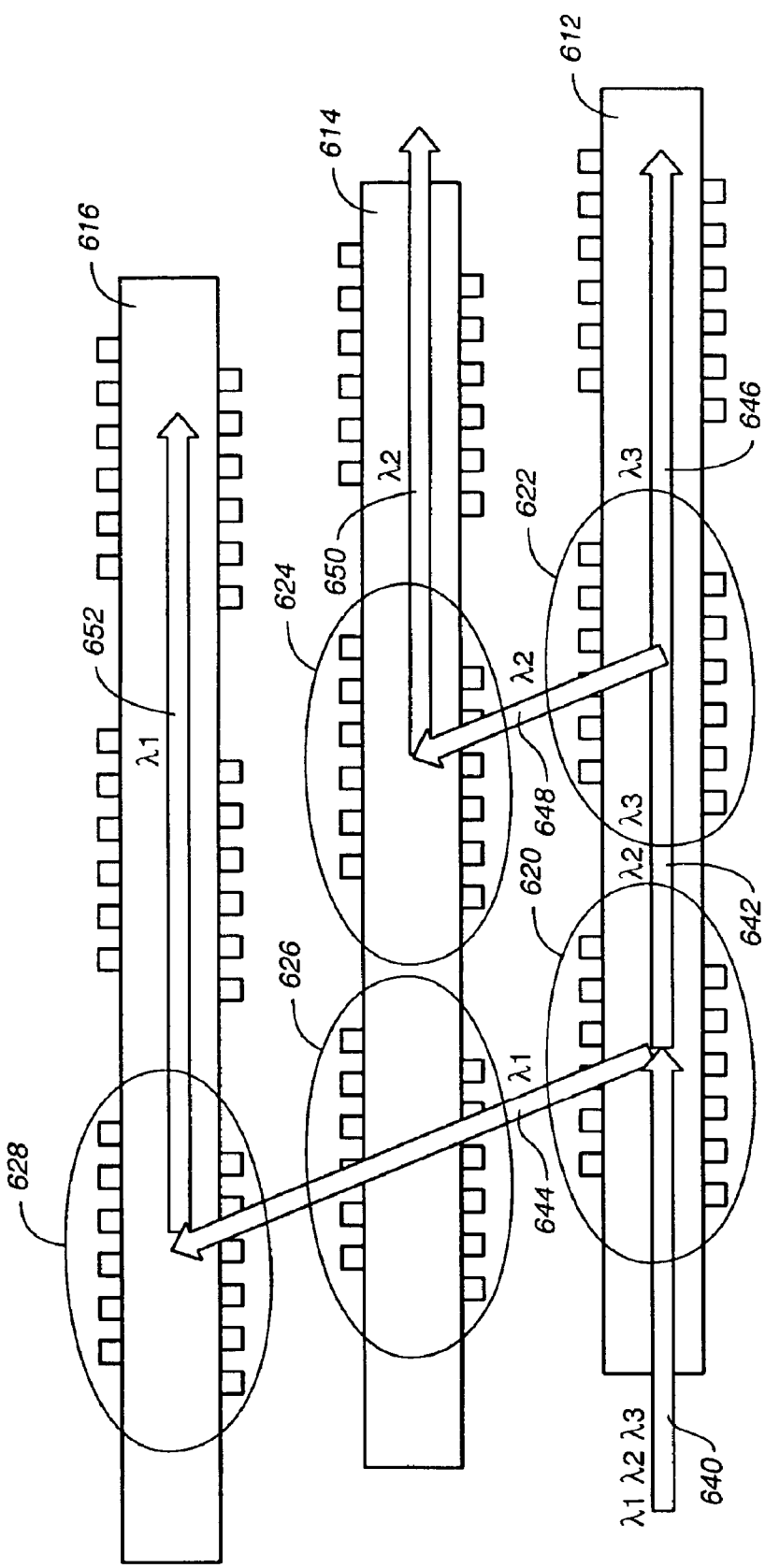
FIG._13

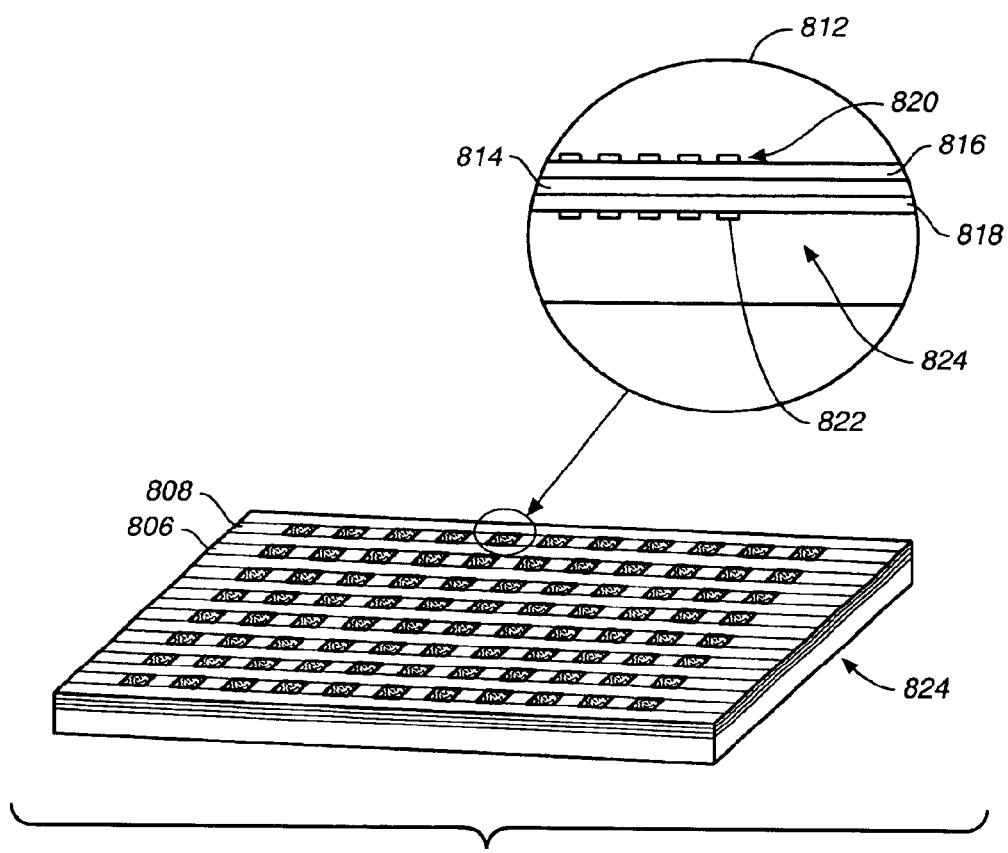
FIG._14

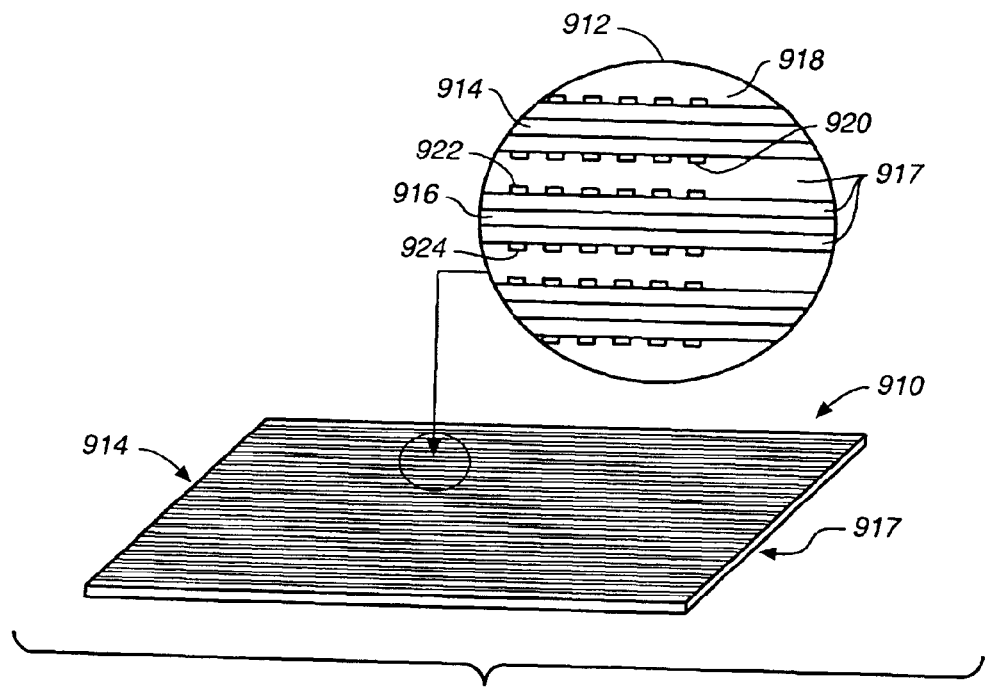
FIG._15
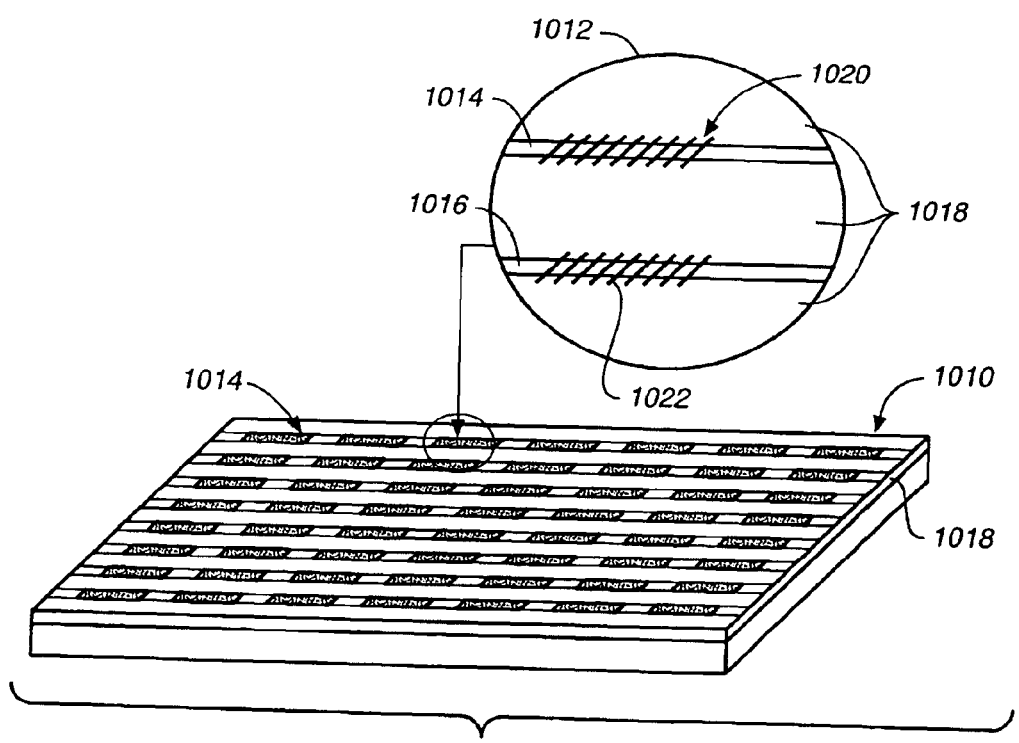
FIG._16

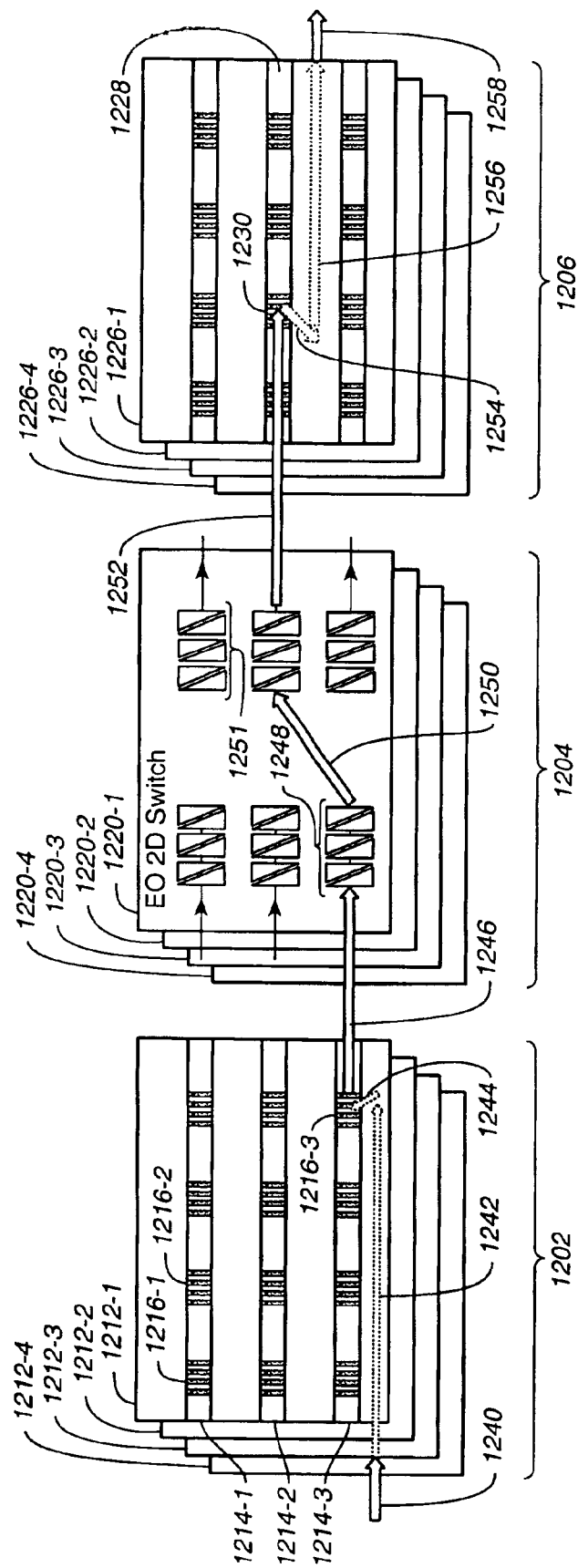
FIG._17

MULTI-LAYER THIN FILM OPTICAL WAVEGUIDE SWITCH

FIELD OF THE INVENTION

The invention relates generally to the field of optical communications, and in particular to an optical switch.

BACKGROUND OF THE INVENTION

The strong growth of optical networks for voice and data communication has created a huge demand for high data rate information transfer capabilities. To enable such transfer capabilities, dense wavelength division multiplexing (DWDM) technology has been developed which allows transfer of multiple wavelength light beams over a single optical fiber leading to data transfer rates up to 40–100 Gb/s. High speed switching and routing devices comprise the core elements of the optical networks and allow dynamic control of the data traveling over the optical network. High data transmission rates impose significant demands on the functionality of the switching devices.

Optical cross-connect space division switches based on electro-optic (EO) deflection of the light beam have great potential for use in high speed optical networks. The basic requirements for such devices are the need for extremely fast switching time and the capability to handle a large number of input and output channels, e.g., up to 4000×4000 by the year 2003. Reliability and cost are also important design factors for optical switching devices. Existing optical switching devices which employ signal conversion from optical into electrical and back into optical do not satisfy the anticipated requirements for such devices.

Currently, the main optical switching products on the market are based on micro-electromechanical systems or MEMS technology, which employs rotating micro-mirrors to deflect light. However, these optical switching devices are not very reliable due to the large number of moving parts, and are limited by the switching time caused by the mechanics of the mirrors.

Therefore, there is a need for a high speed optical switching device which allows switching between a large number of input channels and output channels.

SUMMARY OF THE INVENTION

The present invention comprises a method and system for switching at least part of a light signal out of a first waveguide by a Bragg grating formed from an electro-optic effect in the first waveguide. The Bragg grating is created by turning on a plurality of electrodes on each side of the first waveguide. The electrodes create electric fields in the core of the first waveguide which raise the refractive index in certain regions of the core. When the electric fields are tilted and evenly spaced apart, at least part of a light signal propagating through the waveguide, at a predetermined wavelength, is reflected out of the first waveguide. The reflected light signal can be switched back into a second waveguide by use of another Bragg grating. When the electric fields are off in the first waveguide the light signal, including the part of the light signal having the predetermined wavelength, continues straight on through the Bragg grating area. Thus a light signal of the predetermined wavelength is either switched to the second waveguide or kept in the first waveguide depending on whether the voltages are turned on or off so that there is an electrical control of an optical signal path.

One embodiment of the present invention comprises a method for changing the path of at least part of a light signal propagating through a waveguide, where the waveguide has only a first refractive index, when a plurality of electric fields are absent. First, a fiber Bragg grating having regions of a second refractive index in the waveguide is generated. The regions are formed by the plurality of electric fields at an intermediate portion of the waveguide, where the regions are tilted with respect to a normal to a longitudinal axis of the waveguide. Next, at least part of the light signal at the fiber Bragg grating is reflected out of the waveguide.

Another embodiment of the present invention comprises an optical switching device for changing a path of at least part of a light signal. The optical switching device includes a slab waveguide having a top clad, bottom clad, and core, where the core has a electro-optic material. The core is positioned in between the top and bottom clads and has a first refractive index. The core receives the light signal. The optical switching device further includes: a plurality of top electrodes attached to the top clad; and a plurality of bottom electrodes attached to the bottom clad. Each top electrode has an associated bottom electrode and they cause an electric field to be formed that is tilted with respect to a perpendicular axis of the core, such that at least part of the light signal is reflected out of the slab waveguide. The electric field changes a region in the core to a second refractive index larger than the first refractive index.

An aspect of the present invention comprises a method for switching at least part of a light signal from a first waveguide to a second waveguide. The light signal is received by the first waveguide. Next a Bragg grating is formed using a plurality of electric fields, where at least part of the light signal is redirected by the Bragg grating to the second waveguide.

Another aspect of the present invention comprises a method for switching a light signal from a first waveguide to a second waveguide. First, the light signal is received by the first waveguide. A Bragg grating is created in a region of a first refractive index by alternating tilted sub-regions of a second refractive index formed by a plurality of electric fields with subregions of the first refractive index. The light signal in the first waveguide is reflected at the Bragg grating towards the second waveguide and received by the second waveguide.

A further aspect of the present invention comprises a system for sending at least a part of a light signal, having a predetermined wavelength, out of a waveguide. The system includes: a plurality of top electrodes positioned parallel and adjacent to a first side of a core of the first waveguide, where the spacing between the plurality of top electrodes is a function of the wavelength; and a plurality of bottom electrodes positioned parallel and adjacent to a second side of the core, where the plurality of bottom electrodes are offset in position from the plurality of top electrodes. Each top electrode has a corresponding bottom electrode and are positioned to create an electric field in the first waveguide at an angle from a normal to a longitudinal axis of the core, such that at least part of the light signal is reflected out of the waveguide as the light signal propagates through one or more electric fields in the waveguide.

Another embodiment of the present invention comprises a system for switching at least part of a light signal having a first predetermined wavelength between a plurality of slab waveguides. The system includes: a first slab waveguide comprising a first Bragg grating, where the first Bragg grating reflects at least part of the light signal out of the first slab waveguide and is formed by electric fields slanted at an angle in the first slab waveguide; a plurality of electrodes attached to the first slab waveguide for producing the electric fields; and a second slab waveguide having a second Bragg grating for receiving the reflected part of the light signal.

Yet another embodiment of the present invention comprises a three dimensional multi-layered optical switch includes a first stack of first switching planes for switching light signals between planes, where each first switching plane has at least one waveguide and each waveguide includes Bragg gratings. The Bragg gratings are formed in a core of each waveguide by a plurality of electric fields increasing a refractive index of the core at predetermined regions in the core. The 3D multi-layered optical switch further includes a second stack of electro-optic 2D switches for switching light signals within a plane, where the second stack is optically aligned with the first stack; and a third stack of second switching planes for switching light signals between planes, where the third stack is optically aligned with the second stack. Each second switching plane has at least one waveguide, and each waveguide of the third stack includes Bragg gratings.

These and other embodiments, features, aspects and advantages of the invention will become better understood with regard to the following description, appended claims and accompanying drawings.

BRIEF DESCRIPTION OF THE DRAWINGS

FIG. 1 is a schematic of a top view of a cross-connect switching device.

FIG. 2 is a layout of a top view of a three-dimensional (3D) multi-channel optical switch having a plurality of EO 2D switches.

FIG. 3 shows a cross sectional view of a fiber Bragg grating in a waveguide.

FIG. 4 illustrates the Bragg effect on a non-resonant light signal and a resonant light signal.

FIG. 5 is a cross sectional view of a waveguide having an electro-optic Bragg grating of a preferred embodiment of the present invention.

FIG. 6 shows the electric fields strengths in a cross sectional view of an electro-optic Bragg granting of an alternative embodiment of the present invention.

FIG. 7-1 is an expanded portion of FIG. 5 of an embodiment of the present invention.

FIG. 7-2 is a schematic of a top view of a portion of FIG. 5 of an embodiment of the present invention.

FIG. 7-3 is a schematic of a top view of a portion of FIG. 5 of another embodiment of the present invention.

FIG. 8 is an expanded cross-sectional view of a waveguide having a tilted axis of an embodiment of the present invention.

FIG. 9 shows a simplified example of constructive interference of a Bragg reflection in a waveguide of one embodiment of the present invention.

FIG. 10 shows an example of the bending of a light signal exiting a waveguide surrounded by a material.

FIG. 11 shows a cross-sectional example of single wavelength light signals being switched between planes.

FIG. 12 shows another cross-sectional example of single wavelength light signals being switched between planes.

FIG. 13 is a cross-sectional view of a demultiplexer of an aspect of the present invention.

FIG. 14 is substrate having multiple waveguides with Bragg gratings of one embodiment of the present invention.

FIG. 15 is a 2D Bragg grating switch of another embodiment of the present invention.

FIG. 16 is a 2D Bragg grating switch of yet another embodiment of the present invention.

FIG. 17 shows a multi-channel three-dimensional switch of an embodiment of the present invention.

DETAILED DESCRIPTION OF THE INVENTION

In the following description, numerous specific details are set forth to provide a more thorough description of the specific embodiments of the invention. It is apparent, however, to one skilled in the art, that the invention may be practiced without all the specific details given below. In other instances, well known features have not been described in detail so as not to obscure the invention.

U.S. patent application titled "An Optical Switching Apparatus with Divergence Correction," by Glebov, et. al., filed Apr. 24, 2002, (Attorney Docket No. 25916-245 (6136/60636)), which is herein incorporated by reference in its entirety, provides an improved optical switching apparatus, which allows fabrication of a non-blocking optical cross connect switching matrix with a large number of I/O channels. The optical switching device employs EO induced deflection of an incoming optical beam or optical signal to reroute the incoming light signal from an input port to an output port.

A hybrid integration process, including an EO deflecting element disposed on a silicon substrate, forming a (2×2) cross-connect switching device is described in this application. The 2×2 cross-connect switching device is used for illustration only, and embodiments of the integration process can easily be extended to fabricate switching systems with a larger number of I/O ports. A N×N cross-connect planar switching device, for the purposes of this application is called an EO 2D Switch, since the planar switching device, switches light signals in a plane using an electo-optical effect. "N" is a positive integer.

FIG. 1 is a schematic of a top view of a cross-connect switching device 10. The cross-connect switching device 10 transfers a first light signal from input port 1 to either output port 1 or to output port 2. A second light signal may also be transferred from input port 2 to the remaining output port not receiving the first light signal. Thus, if output port 2 receives the first light signal from input port 1, output port 1 would receive the second light signal from input port 2. When there is no crossing of optical signals, such as where a light signal input into the first input port 1 is transmitted to the output port 1, and a light signal input into the second input port 2 is transmitted to the output port 2, a control voltage is not applied to any of the light deflection elements 13a, 13b, 15a, and 15b, and thus, no light signals are deflected at the light deflection elements 13a, 13b, 15a, and 15b. Accordingly, the light signal input into channel waveguide 11a is transmitted to light waveguide 17a, and the light signal input into channel waveguide 11b is transmitted to light waveguide 17b.

When a light signal input into the input port 1 is to be transmitted to the output port 2 and a light signal input into the input port 2 is to be transmitted to the output port 1, a positive control voltage +V is applied to the control electrodes of the light deflection elements 13a and 15b and a negative control voltage −V is applied to the control electrodes of the light deflection elements 13b and 15a.

Accordingly, the light signal input into the input port 1 is deflected toward the right hand direction by light deflection element 13a, and then, upon reaching light deflection element 15b, the deflected light signal is deflected again into a direction parallel to the longitudinal axis of optical waveguide 17b at light deflection element 15b, and is focused by focusing lens 16b into the optical waveguide 17b, and then transmitted into the output port 2. Similarly, the light signal input into the input port 2 is deflected by light deflection element 13b and into light deflection element 15a, and then, upon reaching light deflection element 15a, the deflected light signal is deflected again into a direction parallel to the longitudinal axis of optical waveguide 17a at the light defection element 15a, and is then transmitted to the output port 1 through the focusing lens 16a and the optical waveguide 17a.

Multiple EO 2D switches can be stacked to increase the total number of input and output ports. While there is switching of light signals in each plane, there is no switching between planes. Thus the number of switching combinations is limited. One way to achieve switching between planes is to rotate by 90° a second stack of EO 2D switches and connect this second stack to the first unrotated stack.

FIG. 2 is a layout of a top view of a three-dimensional (3D) multi-channel optical switch 40 having a plurality of EO 2D switches. Two stacks of EO 2D switches, e.g., stacks 50 and 54, are connected together by a stack of EO 2D rotated 900, i.e., stack 52, to form the three stage 3D switch 40. The stack 50 of EO 2D switches, include EO 2D switches 60-1, 60-2, and 60-3. Each EO 2D switch, e.g., 60-1, has a plurality of light deflection elements, e.g., 72, 76, 82, and 86. The stack 52 of rotated EO 2D switches, include EO 2D switches 62-1, 62-2, and 62-3. The stack 54 of EO 2D switches include EO 2D switches 64-1, 64-2, and 64-3. An example showing the switching of a light signal is given by a light signal 70 entering the EO 2D switch 60-1. The input light signal 70 is switched to intermediary light signal 74 via light deflection elements 72. The intermediary light signal 74 is switched to output light signal 78 via light deflection elements 76. The output light signal 78 is switched by rotated EO 2D switch 62-1 to EO 2D switch 64-1 of stack 54 giving light signal 80. Light signal 80 is then switched in EO 2D switch 64-1 to give output light signal 88 via light deflection elements 82 and 86. Thus the EO 2D switches in stacks 50 and 54 provide the optical switching in a plane and the rotated switch 52 provides the third dimension in switching from one plane to another plane.

In an exemplary embodiment of the present invention light signals are transferred between planes using controllable fiber Bragg gratings. While conventionally, permanent Bragg gratings are formed in a waveguide by either ultraviolet beams or by etching them in the waveguide, in the present invention, the Bragg gratings are formed by varying the index of refraction in the waveguide using the electro-optic effect and can be turned off and on using an external voltage. When turned off, there are no Bragg gratings and the light passes through. If turned on, one wavelength of a light signal is reflected out of the and any other wavelengths are passed through. These dynamic Bragg gratings allow switching between planes.

Actually, a narrow band of wavelengths centered around the one wavelength is reflected, however, for ease of explanation and so as not to obscure the invention, we use single wavelengths rather than bands of wavelengths. However, it should be understood that when we use a discrete single wavelength, a narrow band of wavelengths centered around the given wavelength may be included.

In conventional fiber Bragg gratings used to reflect a single wavelength, there are uniformly spaced regions formed in the fiber with a refractive index that has been raised from that of the rest of the core. These regions scatter light by what is called the Bragg effect. Bragg gratings selectively reflect one wavelength (or a very narrow range around one wavelength) and allow the other wavelengths to pass on through the grating. The reflected wavelength is twice the spacing between the regions of higher refractive index. Reflection occurs due to constructive interference. The spacing between the regions of higher refractive index is called "Λ" herein, i.e., the grating pitch.

FIG. 3 shows cross sectional view of a fiber Bragg grating in a waveguide 110. The waveguide 110 includes: a top clad 112, a core 114, and a bottom clad 116. The core 114 has a refractive index of n1. Equally space regions, e.g., regions 120-1, 120-2, 120-3, 120-4, 120-5, 120-6, etc., of a higher refractive index n2 (n2>n1) are formed in the core 114. These regions are the Bragg grating 130. For example, part of one wavelength of a multi-wavelength light signal 125 is reflected at region 120-5, and the rest of the wavelengths pass-through as light signal 129. While reflection at only one region is shown, reflection occurs for the one wavelength at each region, e.g., regions 120-1, 120-2, 120-3, 120-4, 120-5, 120-6, etc.

FIG. 4 illustrates the Bragg effect on a non-resonant light signal 212 and a resonant light signal 214. Light signal 212 has a wavelength that is not a multiple of two times the spacing, i.e., 2Λ, between the regions, e.g., regions 120-1, 120-2, 120-3, 120-4, 120-5, 120-6, etc., and passes through the grating substantially unaffected. Light signal 214 has a wavelength equal to a multiple of 2Λ. This wavelength when measured in air rather than the core is called the Bragg wavelength, $\lambda_B$, and is given by:

$$\lambda_B = n1 * 2 * \Lambda \qquad \text{[Equation 1]}$$

where Λ is the spacing between regions and n1 is the refractive index of the core 114 (the refractive index enters Equation 1, because the reflected wavelength is normally measured in air). For illustration, part of light signal 214 is shown in FIG. 4 as being reflected 180° at region 120-5 to give reflected light signal 216. Because the wavelength of signal 214 is twice the distance between regions, at for example, regions 120-4 and 120-5, the reflected light signal 216 is in phase with the parts of light signal 214 reflected from, for example, regions 120-1 to 120-4 (as well as, e.g., regions 120-6, 120-7, etc.). Thus at the Bragg wavelength, the parts of the light signal reflected from each region constructively interfere.

The Bragg effect can be used to reflect a wavelength of a multi-wavelength light signal out of the waveguide, when the regions of higher refractive index, e.g., 120-1, 120-2, of FIG. 3 are tilted from the longitudinal axis of the core 114. If tilted in one direction the wavelength can be reflected up, and if tilted the other way the wavelength can be reflected down (FIGS. 6 and 7).

FIG. 5 is a waveguide having an electro-optic Bragg grating of a preferred embodiment of the present invention. In FIG. 5 the waveguide has top clad 312, core 314 and bottom clad 316. The core is composed of a electro-optic material with refractive index n1. The top and bottom clad layers, 312 and 314, have a refractive index n3, such that n1>n3 (i.e., the core has a higher refractive index than the clad layers). Top electrodes 320, 322, 212, 214, and 218 are positioned on the top clad layer 312. The bottom electrodes 324, 326, 220, 222, 224, and 226 are positioned on the bottom clad layer 316. The top and bottom electrodes form pairs, e.g., (320, 324), (322, 326), (212, 220), which have an associated axes, e.g., 330, 332, 230, respectively, tilted at an angle θ 349 from the perpendicular 390. The electrode pairs are spaced a distance Λ apart from each other. In FIG. 5 the number of electrodes shown is for illustration purposes only and there may be more or less electrode pairs.

FIG. 6 shows the electric fields strengths of cross section view of an electro-optic Bragg granting of an alternative embodiment of the present invention. In one embodiment of the present invention all the top electrodes have a positive voltage with respect to the bottom electrodes. In the alternative embodiment of FIG. 6 top electrodes, e.g., 712 and 716, with a positive voltage, e.g., positive 5 volts, with respect to their corresponding bottom electrodes, e.g., 722 and 726, are alternated with top electrodes, e.g., 710, 714, and 718, with a negative voltage, e.g., negative 5 volts, with respect to their corresponding bottom electrodes, e.g., 720, 724 and 728. An example of electric field intensities between positive voltage electrode 712 and corresponding bottom electrode 722 is about 4 volts per micro-meter (v/μm) for region 736, about 4 to 12 v/μm for region 734, and about 12 to 20 v/μm for region 733. An example of electric field intensities between negative voltage electrode 710 and corresponding bottom electrode 720 is about −4 to −8 v/μm for region 732, about −8 to −12 v/μm for region 730, and about −12 to −16 v/μm for region 731. Region 731 is about 0 v/μm.

FIG. 7-1 is an expanded portion of FIG. 5 of an embodiment of the present invention. In FIG. 7-1 the waveguide has top clad 312, core 314 and bottom clad 316. Top electrodes 320 and 322 are positioned on top clad layer 312. The electrodes 324 and 326 are positioned on bottom clad layer 316. A voltage difference between top electrode 320 and bottom electrode 324 produces an electric field 325-1 in the core 314. A voltage difference between electrode 322 and bottom electrode 326 produces an electric field 325-2 in the core 314. Electric field 325-1 (and 325-2) raises the refractive index of core 314 from n1 to n2. A part of light signal 340 is reflected near the boundary of the area of increased refractive index associated with electric field 325-1 to give light signal 346. The remainder of light signal 340 passes straight through as light signal 344. The reference line 336 is normal to the reference line 330, where reference line 330 is one from one end of top electrode 320 to end of bottom electrode 324. θ is also the angle 342 between the light signal 340 and the normal reference line 336. The light ray 346 portion of the light signal at the Bragg wavelength is reflected at angle θ 348. A potion of the Bragg wavelength of light signal 340, is reflected near the boundary of the area of increased refractive index associated with each electric field, e.g., 325-1 and 325-2 (not shown). These Bragg reflective wavelengths re-enforce each other by constructive interference. The electrodes 320 and electrodes 322 are spaced a distance Λ 334 (i.e., the electrode pitch) apart.

FIG. 7-2 is a schematic of a top view of a portion of FIG. 5 of an embodiment of the present invention. The slab waveguide 740 has parallel rectangular top electrodes, e.g., 744 and 748, which correspond to electrodes 320 and 322 in FIG. 5. The bottom electrodes, e.g., 742 and 746, are in dotted lines to illustrate that the bottom electrodes are below the waveguide 740. The bottom electrodes, e.g., 742 and 746, correspond to bottom electrodes 324 and 326 in FIG. 5.

FIG. 7-3 is a schematic of a top view of a portion of FIG. 5 of another embodiment of the present invention. The slab waveguide 750 has curved top electrodes, e.g., 754 and 758, which correspond to electrodes 320 and 322 in FIG. 5. The curved bottom electrodes, e.g., 752 and 756, are in dotted lines to illustrate that the bottom electrodes are below the waveguide 750. The curved bottom electrodes, e.g., 752 and 756, correspond to bottom electrodes 324 and 326 in FIG. 5. The electrodes are curved to reduce the divergence in the reflected light signal.

FIG. 8 is an expanded cross-section of a waveguide having an angled Bragg grating of an embodiment of the present invention. FIG. 8 is similar to FIG. 7-1 except the electrode pairs are arranged to tilt in the opposite direction. The waveguide shown has top clad 312, core 314 and bottom clad 316. On top of clad 312 are top electrodes 352 and 356. Below bottom clad 316 are bottom electrodes 354 and 358. Electrodes 352 and 354 are aligned as shown by axis 362 which slants at an angle (90−θ) from the longitudinal axis of the core 314. Similarly electrodes 356 and 358 are aligned along axis 364. Axis 362 is a distance Λ 334 from the axis 364. A multi-wavelength light signal 340 enters the core 314 at an angle θ 376 from the normal 366. Part of light signal 340 is reflected at angle θ 378 from the normal 366 to give light signal 372. The rest of light signal 340 continues along the longitudinal axis as light signal 344. Like in FIG. 7-1 only the light with the Bragg wavelength, $\lambda_B$, is reflected. In the case of FIG. 8 the reflection is downward rather than upward as in FIG. 7-1.

FIG. 9 shows a simplified example of constructive interference of a Bragg reflection in a waveguide of one embodiment of the present invention. The waveguide and the electrodes are similar in arrangement to FIG. 7-1. For the purposes of explaining constructive interference, assume the light signal has only one wavelength that proceeds straight down the center of the waveguide. Part of the light signal 340 propagating in core 314 is reflected at axes 330 to produce light signal 346 at angle θ 348 from normal 336. The remainder of the light signal proceeds as light signal 344 until axis 332 when another part of light signal 344 is reflected as light signal 394. The remainder of the light signal continues on as light signal 396. A wavefront for the first reflected light signal 346 is shown by front 382. A wavefront for the second reflected light signal 394 is shown by front 384. The distance between fronts 382 and 384 is "h" 386, where h=Λ*cos 2θ.

For constructive interference to occur, reflected the light signal 346 must be in phase with the reflected light signal 394. This means that a part of wavefront parallel to vertical axis 390 of light signal 340 is reflected at axis 330 to give wavefront 382. The rest of wavefront (parallel to vertical axis 390) proceeds for a distance of Λ 334 to axis 332, where part of the rest of wavefront (parallel to vertical axis 392) is reflected as wavefront 384. When wavefront 384 travels a distance h, it will interfere with wave front 382. When the wavelength is to first order about (Λ+h), then the two wavefronts will be in phase i.e., wave front 384 will constructively interfere with wavefront 382. In actuality there is the light signal includes a narrow bandwidth of wavelengths and there are reflections and refractions when the light signal propagates from the core to the clad. However, to first order, the formula for the Bragg wavelength for a tilted higher refractive region (e.g., axis 330) at angle θ 349 from a vertical axis 390 is approximately:

$$\lambda_B = n1 * \Lambda * (1 + \cos 2\theta) \qquad \text{[Equation 2]}$$

The light signal 346 in FIG. 9 has been simplified and more specifically bends twice before exiting the waveguide, i.e., the first bend is from core 314 to top clad 312 and the second bend is from top clad 312 to the material surrounding the waveguide. In one embodiment the material is air. In another embodiments the material is one which has a refractive index n4, that is greater n3, i.e., n4>n3. In yet another embodiment n4 may be less than or equal to n3.

FIG. 10 shows an example of the bending of a light signal exiting a waveguide surrounded by a material. In this example the material 412 and 414 has a refractive index n4, where n4>n3. The light signal 346 (see also FIG. 9) bends away from the normal (e.g., axis 390), when it enters the clad 312. The ray 420 show the straight line path if the refractive indexes n1 and n3 where the same. Light signal 422 is the refracted light signal 346 in clad 312. If the material 412 and 414 surrounding the waveguide (clads 312 and 316 and core 314), is selected to have a higher refractive index than the clads, i.e., n4>n3, then the light signal 422 will be bent toward the normal when it enters material 412. Light signal 424 shows the refracted light signal 422 in material 412. Thus the light signal leaving the waveguide, e.g., light signal 424, in one embodiment can be made to leave at a direction near the normal, (axis 390).

By arranging a multiple number of Bragg gratings, such as FIG. 5, a plane having multiple waveguides, where each waveguide has multiple Bragg gratings, can be formed to produce a two dimensional (2D) switch. In the preferred embodiment, this 2D switch only switches light signals in or out of the plane, not between waveguides. In another embodiment, this 2D switch switches light signals between waveguides in the plane. Several planes may be stacked on each other in the preferred embodiment to create a 3D switch, which switches light signals between planes.

FIG. 11 shows a cross-section of a switch of an embodiment of the present invention for switching single wavelength light signals between waveguides in different planes. In FIG. 11 there are parallel waveguides 512, 514, and 516, one in each of three parallel planes. A single wavelength light signal 530, i.e., $\lambda 1$, is reflected at Bragg grating 520, which is turned on, in waveguide 512 to give light signal 532. Single wavelength light signal 532 is then reflected in Bragg grating 524 to produce single wavelength light signal 534, i.e., $\lambda 1$, in waveguide 514. Similarly, single wavelength light signal 540, i.e., $\lambda 2$, entering waveguide 514 is reflected at Bragg grating 526 to produce reflected light signal 542. Light signal 542 is reflected at Bragg grating 528 to produce single wavelength light signal 544, i.e., $\lambda 2$, in waveguide 516.

FIG. 12 shows another cross-sectional example of single wavelength light signals being switched between planes. In FIG. 12 there are parallel waveguides 550, 552, and 554, one in each of three parallel planes. A single wavelength light signal 560, i.e., $\lambda 1$, is reflected at Bragg grating 562, which is turned on, in waveguide 554 to give light signal 564. Single wavelength light signal 564 is then reflected in Bragg grating 566 to produce single wavelength light signal 570, i.e., $\lambda 1$, in waveguide 552. Similarly, single wavelength light signal 580, i.e., $\lambda 2$, entering waveguide 550 is reflected at Bragg grating 582 to produce reflected light signal 584. Light signal 584 is transmitted straight through Bragg grating 568 in waveguide 552, because Bragg grating 568 is turned off (i.e., no voltage applied at the electrodes). Light signal 584 is reflected at Bragg grating 586, which is turned on, to produce single wavelength light signal 588, i.e., $\lambda 2$, in waveguide 554.

FIG. 13 is a cross sectional view of a demultiplexer of an aspect of the present invention. There are three parallel waveguides 612, 614 and 616, each with a plurality of Bragg gratings. A multi-wavelength light signal 640, i.e., $\lambda 1$, $\lambda 2$, and $\lambda 3$, enters waveguide 612. At Bragg grating 620 a first wavelength 644, i.e., $\lambda 1$, is reflected and the other two wavelengths 642, i.e., $\lambda 2$ and $\lambda 3$, are passed through. At Bragg grating 622 the multi wavelength light signal 642, i.e., $\lambda 2$ and $\lambda 3$, is divided into a reflected single wavelength signal 648, i.e., $\lambda 2$, and light signal 646, i.e., $\lambda 3$, is passed through. The single wavelength light signal 648, i.e., $\lambda 2$, is reflected in at Bragg grating 624 in waveguide 614 to produce single wavelength signal 650, i.e., $\lambda 2$. Single wavelength signal 644, i.e., $\lambda 1$, propagates through Bragg grating 626, which is turned off and is reflected at Bragg grating 628, which is turned on, in waveguide 616 to produce single wavelength signal 652, i.e., $\lambda 1$. Hence the multi-wavelength signal 640 having three different wavelengths, i.e., $\lambda 1$, $\lambda 2$, and $\lambda 3$, is demultiplexed into single wavelength 646, i.e., $\lambda 3$, in waveguide 612, single wavelength 650, i.e., $\lambda 2$, in waveguide 614, and signal wavelength 652, i.e., $\lambda 1$, in waveguide 616.

FIG. 14 is a substrate having multiple waveguides with Bragg gratings of one embodiment of the present invention. The 2D switching plane 810 has multiple parallel waveguides, e.g., 806 and 808, each waveguide having a Bragg grating element with vertical cross-sectional view 812. The cross-sectional view 812 shows a plurality of top transparent electrodes 820, and a plurality of bottom transparent electrodes 822, an optical waveguide including a top core 816, a core 814, and a bottom clad 818, and a transparent substrate 824 below the bottom clad 818. Multiple 2D switching planes like 2D switching plane 810, can be stacked on top of each other to form a 3D Bragg grating switch that can switch light signals between parallel waveguides on different planes. A transparent substrate 824 can be used to fill the areas between the switching planes, and the refractive index of the substrate 824 may be selected to be greater than the clad of the waveguides to have the reflected light signal bend similarly to FIG. 10.

FIG. 15 is a 2D Bragg grating switch 910 of another embodiment of the present invention, where the switching occurs within the plane rather than between planes. Region 912 is an expanded top view a portion of switch 910. Region 912 shows a plurality of top transparent electrodes 918 and bottom transparent electrodes 920, for core 914 and top transparent electrodes 922 and bottom transparent electrodes 924 for core 916. The cores and the electrodes are embedded in a clad material 917.

FIG. 16 is a 2D Bragg grating switch 1010 of yet another embodiment of the present invention. The switching occurs again within the plane rather than between planes. Region 1012 is a top view of an expanded cross-section of a portion of 2D switch 1010. Region 1012 shows cores 1014 and 1016 embedded in a clad later 1018. The top Bragg grating electrodes are slanted, e.g., top electrodes 1020 and 1022. The slanted bottom electrodes (not shown) are on the bottom of the cores 1014 and 1016, respectively.

FIG. 17 shows a multi-channel three-dimensional switch of an embodiment of the present invention. There are two stacks 1202 and 1206 of Bragg grating switching planes separated by a stack 1204 of EO 2D switches. The first stack 1202 has Bragg grating switching plane 1212-1, 1212-2, 1212-3 and 1212-4. Each switching plane, e.g., plane 1212-1, has a plurality of waveguides, e.g., waveguides 1214-1, 1214-2, and 1214-3. And each waveguide, for example, waveguide 1214-1 has a plurality of Bragg gratings, e.g. 1216-1 and 1216-2. FIG. 14 shows an example of a switching plane, e.g., plane 1212-1. A second stack of Bragg gratings 1206 has a plurality of Bragg grating switching planes 1226-1, 1226-2, 1226-3, and 1226-4. Like stack 1202, each Bragg grating switching planes has a plurality of waveguides, e.g., 1228. The Bragg grating switching planes stacks 1202 and 1206 are separated by an EO 2D switch stack 1204 which has four 2D EO switching planes 1220-1, 1220-2, 1220-3, and 1220-4. Thus the two Bragg grating switching stacks 1202 and 1206 provide the switching between the planes and 2D EO stack 1204 provides the switching in a plane.

An example of how the 3D optical switching array of FIG. 17 works is given for an input light signal 1240. Light signal 1240 enters a waveguide (not shown) in Bragg grating switch 1212-2 and is reflected by a Bragg grating (not shown) in the waveguide to give reflected light signal 1244. Reflected light signal 1244 is transmitted to switch 1212-1 from switch 1212-2 and is reflected in Bragg grating 1216-3 to produce light signal 1246. The light signal 1246 enters 2D EO switch 1220-1 from switch 1212-1 and is switched via prism elements 1248 to give light signal 1250, i.e., light signal 1250 is switched within the plane. Light signal 1250 is switched by prism elements 1251 to produce light signal 1252. Light signal 1252 goes from EO 2D switch 1220-1 to waveguide 1228 on Bragg grating switch 1226-1. At Bragg grating 1230 light signal 1252 is reflected to give light signal 1254 which goes to a waveguide (not shown) on card 1226-3. Light signal 1254 is then reflected in a Bragg grating (not shown) on card 1226-3 to produce light signal 1256, which propagates through the waveguide (not shown) in Bragg grating card 1226-3 to produce light signal 1258 as the output light signal. Thus input light signal 1240 on a bottom waveguide in switch 1212-2 (the second switch) has been switched to a middle waveguide on switch 1226-3 (the third switch) to output light signal 1258.

The specification and drawings are provided for illustrative purposes. It will be evident that additions, subtractions, deletions, and other modifications and changes may be made thereunto without departing from the broader spirit and scope of the invention as set forth in the claims.

What is claimed is:

1. A method for changing a path of at least part of a light signal propagating through a waveguide, wherein said waveguide has only a first refractive index, when a plurality of electric fields are absent, said method comprising:
    generating a plurality of fiber Bragg gratings, each of said gratings comprising a plurality of regions of a second refractive index in said waveguide, each of said regions formed by an electric field at an intermediate portion of said waveguide, wherein said regions are tilted with respect to a longitudinal axis of said waveguide and wherein the electric fields associated with said gratings are independently controllable; and
    reflecting at least part of said light signal at one or more of said fiber Bragg gratings out of said waveguide.

2. The method of claim 1 wherein each of said plurality of gratings is created by a plurality of electric fields generated by a plurality of electrodes located on a top of and bottom of said waveguide and wherein the light signal reflected by a grating has a wavelength that is a function of said tilting and a spacing between said plurality of electrodes associated with such granting.

3. The method of claim 2 wherein said top electrodes of said plurality of electrodes are rectangular in shape and parallel to each other.

4. The method of claim 2 wherein said top electrodes of said plurality of electrodes are curved in shape.

5. The method of claim 2 wherein said top electrodes of said plurality of electrodes of at least one of said granting have a positive voltage applied thereto.

6. The method of claim 2 wherein a first top electrode of said plurality of electrodes has a positive voltage and a second top electrode of said plurality of electrodes has a negative voltage.

7. An optical switching device for changing a path of at least part of a light signal, comprising;
    a slab waveguide comprising a top clad, bottom clad, and core, said core comprising an electrooptical material, said core positioned in between said top and bottom clads and having a first refractive index, wherein said core receives said light signal;
    a plurality of independently controllable grating structures, each of said grating structures comprising:
    a plurality of top electrodes attached to said top clad; and
    a plurality of bottom electrodes attached to said bottom clad;
    wherein a top electrode of said plurality of top electrodes has an associated bottom electrode of said plurality of bottom electrodes; and
    the top and bottom electrodes associated with each of said grating structures being arranged such that when a voltage difference is created between the top electrodes and the associated bottom electrodes of a grating structure a plurality of electric fields are formed within said core that are tilted with respect to a perpendicular axis of said core such that at least part of said light signal is reflected out of said slab waveguide by said grating structure, wherein said electric field changes a region in said core to a second refractive index, said second refractive index larger than said first refractive index.

8. The optical switching device of claim 7 wherein said path of at least part of said light signal is changed based on an angle said electric field is tilted at.

9. The optical switching device of claim 7 wherein said electric field is part of an electro-optically formed Bragg grating.

10. The optical switching device of claim 7 further comprising a material attached to said top clad having a third refractive index larger than a clad refractive index.

11. The optical switching device of claim 10 wherein said material is transparent.

12. A method for switching at least part of a light signal from a first waveguide to a second waveguide, said method comprising:
    receiving said light signal by said first waveguide;
    forming a plurality of independently controllable Bragg gratings, each of said gratings using a plurality of electric fields;
    reflecting at least part of said light signal at at least one of said Bragg gratings toward said second waveguide; and
    receiving at least part of said light signal by said second waveguide.

13. The method of claim 12 wherein said receiving at least part of said light signal comprises, reflecting at least part of said light signal into said second waveguide using another Bragg grating.

14. A method for switching a light signal from a first waveguide to a second waveguide, said method comprising:
    receiving said light signal by said first waveguide;
    creating a plurality of independently controllable Bragg gratings in said first waveguide, each of said Bragg gratings being formed in a region of a first refractive index by alternating tilted sub-regions of a second refractive index formed by a plurality of electric fields with sub-regions of said first refractive index;
    reflecting said light signal in said first waveguide at at least one of said Bragg gratings towards said second waveguide; and
    receiving said light signal by said second waveguide.

15. The method of claim 14 wherein said tilted sub-regions are tilted at an angle θ from a normal to said first waveguide's longitudinal axis.

16. The method of claim 14 wherein said receiving said light signal comprises, reflecting said part of said light signal into said second waveguide using a Bragg grating formed within said second waveguide.

17. A system for sending at least a part of a light signal, having one or more wavelengths, out of a waveguide, said system comprising:

a plurality of independently controllable grating structures positioned along the length of said waveguide, each of said grating structures comprising:

a plurality of top electrodes positioned parallel and adjacent to a first side of a core of said waveguide, wherein spacing between said plurality of top electrodes is a function of said wavelength; and a plurality of bottom electrodes positioned parallel and adjacent to a second side of said core, said plurality of bottom electrodes offset from said plurality of top electrodes; and wherein each top electrode of said plurality of top electrodes has a corresponding bottom electrode of said plurality of bottom electrodes; and wherein each top electrode and corresponding bottom electrode is positioned to create an electric field in said first waveguide when a voltage difference is created therebetween at an angle to a longitudinal axis of said core, such that at least part of said light signal propagating through said waveguide is reflected out, of said waveguide by at least one of said gratings.

18. The system of claim 17 wherein said top and bottom electrodes are transparent electrodes.

19. A system for switching at least part of a light signal between a plurality of slab waveguides, comprising:

a first slab waveguide comprising a plurality of independently controllable Bragg grating structures, each of said Bragg grating structures for reflecting at least part of said light signal out of said first slab waveguide and formed by a plurality of electric fields slanted at an angle in said first slab waveguide;

each Bragg grating structure comprising a plurality of electrodes attached to said first slab waveguide for producing said electric fields; and a second slab waveguide comprising a at least one additional Bragg grating for receiving said reflected light signal.

20. The system of claim 19 wherein said first slab waveguide further comprises an output end for transmitting out of said first slab waveguide the portion of said light signal which passes through said Bragg gratings in said first slab waveguide.

21. The system of claim 19 further comprising a transparent material between said first and second slab waveguides.

22. The system of claim 19 wherein said plurality of electrodes are transparent.

23. The system of claim 19 wherein a reflection angle for said reflected light signal is related to said angle said electric fields are slanted at.

24. The system of claim 19 further comprising:

a first switching plane having a first group of said plurality of slab waveguides, wherein each slab waveguide of said first group comprises a first plurality of independently controllable Bragg gratings; and a second switching plane parallel to said first switching plane having a second group of said plurality of slab waveguides, wherein each slab waveguide of said second group comprises a second plurality of independently controllable Bragg gratings.

25. The system of claim 19 further comprising: a switching plane comprising said plurality of slab waveguides.

26. A three dimensional multi-layered optical switch comprising:

a first stack of first switching planes for switching light signals between planes, each first switching plane comprising at least one waveguide, each waveguide of said first stack comprising a first plurality of independently controllable Bragg gratings, wherein each of said first plurality of Bragg gratings is formed in a core of each waveguide by a plurality of electric fields created by electrodes attached to the core for increasing a refractive index of said core at predetermined regions in said core;

a second stack of electro-optic 2D switches for switching light signals within a plane, said second stack optically aligned with said first stack; and a third stack of second switching planes for switching light signals between planes, said third stack optically aligned with said second stack, wherein each second switching plane comprises at least one waveguide, each waveguide of said third stack comprising a second plurality of independently controllable Bragg gratings, wherein each of said second plurality of Bragg gratings is formed in a core of each waveguide by a plurality of electric fields created by electrodes attached to the core for increasing a refractive index of said core at predetermined regions in said core.

* * * * *